United States Patent
Zhang et al.

[11] Patent Number: 6,038,096
[45] Date of Patent: Mar. 14, 2000

[54] ADAPTIVE SECTOR SEEKING METHOD FOR REDUCING DISK DRIVE POWER CONSUMPTION

[75] Inventors: Xiao Zhang, Cupertino; Hyung-Ki Hong; Chang-Ik Kang, both of San Jose, all of Calif.

[73] Assignee: Samsung Electronics Co., Ltd., Suwon, Rep. of Korea

[21] Appl. No.: 08/919,153

[22] Filed: Aug. 28, 1997

[51] Int. Cl.[7] .............................. G11B 21/12; G11B 21/10
[52] U.S. Cl. ....................... 360/78.04; 360/70; 360/78.06
[58] Field of Search .................. 360/69, 70, 75, 360/78.01, 78.04, 78.06, 78.07, 78.08, 78.14; 395/750.03, 750.05

[56] References Cited

U.S. PATENT DOCUMENTS

| | | | |
|---|---|---|---|
| 5,099,368 | 3/1992 | Okamura | 360/73.03 |
| 5,140,571 | 8/1992 | Nishida et al. | 369/44.11 |
| 5,345,347 | 9/1994 | Hopkins et al. | 360/71 |
| 5,381,279 | 1/1995 | Dunn | 360/75 |
| 5,402,200 | 3/1995 | Shrinkle et al. | 360/69 |
| 5,412,809 | 5/1995 | Tam et al. | 395/750 |
| 5,452,277 | 9/1995 | Bajorek et al. | 369/54 |
| 5,493,670 | 2/1996 | Douglis et al. | 395/750 |
| 5,521,896 | 5/1996 | Bajorek et al. | 365/54 |
| 5,544,138 | 8/1996 | Bajorek et al. | 369/54 |
| 5,579,186 | 11/1996 | Yamamoto et al. | 360/75 |
| 5,671,099 | 9/1997 | Ishii et al. | 360/67 |
| 5,801,894 | 9/1998 | Boutaghou et al. | 360/75 |

FOREIGN PATENT DOCUMENTS

| | | |
|---|---|---|
| 63-87663 | 4/1988 | Japan . |
| 1-245471 | 9/1989 | Japan . |
| 1-267876 | 10/1989 | Japan . |
| 4-177677 | 6/1992 | Japan . |
| 6-267215 | 9/1994 | Japan . |

*Primary Examiner*—David L. Ometz
*Attorney, Agent, or Firm*—Jones Volentine, L.L.P.; Jeffrey P. Aiello

[57] ABSTRACT

Method of reducing power consumption in a disk drive system by controlling movement time of a read/write head from a present track and present sector to a target track and target sector. The method includes the steps of determining a first variable indicative of a first time period in which to move the actuator head from the present track to the target track along a radial arc traced by the movement of the actuator head and determining a second variable indicative of a second time period measured from the present servo sector to when the target servo sector advances to the radial arc. The actuator head is moved at a first rate substantially equal to the first time period if the first variable and the second variable are equal. The actuator head is moved at a second, slower rate if the first variable and the second variable are not equal. Moving the actuator head at a slower rate reduces power consumption and increases battery life.

3 Claims, 3 Drawing Sheets

ADAPTIVE SECTOR SEEKING METHOD FOR REDUCING DISK DRIVE POWER CONSUMPTION

BACKGROUND OF THE INVENTION

1. Field of the Invention

The present invention generally relates to a method of reducing power consumption in a disk drive system, and more particularly, to a read/write head actuator that is controlled so as to reduce power consumption without sacrificing data access time.

2. Description of the Related Art

Reducing power consumption is a basic requirement for disk drive data storage systems. In particular, users of mobile and notebook computer systems view battery life between charges as one of the most important system characteristics. As such, methods of reducing power consumption, or battery power management, are crucial to extending the life of the battery between charges.

One such power management design is based on the fact that in a typical disk drive data system operation, the disk drive is not always conducting reading and writing operations. Thus, there are certain periods of non-work or low power consumption. Firmware or software can be designed to control the flow of battery power based on this model. Using such a power management system, the typical disk drive power specifications for an IBM Travelerstar 4LP, for example, are listed in Table 1 below, with a typical dissipation of 0.94 amps:

TABLE 1

Power Consumption For Each Disk Drive Mode

| Disk Drive Mode | Power |
|---|---|
| Start-Up (Maximum Peak) | 2.3 Watts |
| Seeking (Average) | 2.3 Watts |
| Read/Write (Average) | 1.85 Watts |
| Performance Idle (Average) | 0.85 Watts |
| Low Power Idle (Average) | 0.3 Watts |
| Sleep | 0.1 Watts |

In the start-up mode, the power consumption is mainly due to the operation of the spindle motor, which rotates a disk platter.

The track and sector seeking and read/write modes identify the power consumption during normal operations. In such normal operations, an actuator supports one or more read/write heads, with the actuator being driven by an actuator motor (also called a voice control motor (VCM)). Current is passed through an actuator coil, causing the actuator motor to rotate the actuator and read/write heads to radial data tracks on the disk platter surface. As shown in Table 1, the more reading and writing operations that are conducted, the more seeking operations that must be carried out, and consequently, the more power will be consumed. Also note that the seeking operations require the most power.

The performance idle, low power idle and sleep modes represent the power consumption resulting from a power management scheme. In this example, power consumption is reduced by about 31% over the conventional disk drive system without power management. Such an exemplary power management technique is shown in, for example, U.S. Pat. Nos. 5,452,277, 5,544,138 and 5,521,896. Such patents compare energy usage with a predetermined profile to select one of several reduced power operating modes.

Other methods of power consumption control the rotation of the spindle motor, and thus the disk platter, to reduce power consumption as shown in U.S. Pat. Nos. 5,345,347 and 5,493,670.

In U.S. Pat. No. 5,140,571, power consumption is reduced using a digital signal processor (DSP) during intermittent periods. However, the amount of power consumed by the DSP is relatively low compared with the power used for driving the actuator motor and spindle motor.

In U.S. Pat. No. 5,412,809, a user can select either a performance optimized control assess time algorithm, or a power consumption optimized control assess time algorithm. This method, however, supplies just these two options. Another disadvantage is that the reduced power consumption option sacrifices the average access time to achieve its goal.

While each of the above power management methods reduces overall disk drive power consumption somewhat, none reduce the main component of the disk drive's power consumption, namely, the seeking procedure, without sacrificing data access time.

In all the above power management methods, the seeking procedures are implemented under the assumption that the actuator is controlled to move the read/write heads as fast as possible from one track to another track in a "track seeking" mode. Once the heads land on the designated track, the servo system typically enters a "track following" mode to find a desired sector within the track. The "track following" mode consumes much less power than the "track seeking" mode. This is because the maximum current is supplied to the power amplifier and actuator coil in the track seeking mode to move the head as fast as possible. The more current supplied to the actuator coil, the faster the actuator arm is rotated and the faster the heads move.

In light of the foregoing, there exists a need for a method of reducing the power consumption associated with the seeking operation, without sacrificing data access time.

SUMMARY OF THE INVENTION

The present invention is directed to a method of reducing power consumption in a disk drive system by controlling a read/write head actuator to reduce power consumption without sacrificing data access time, which substantially overcomes one or more of the problems due to the limitations and disadvantages of the related art.

In general, the present inventive method includes the steps of providing inputs $L_T$ and $T_{rev}$, where $L_T$ is a positional difference between the present track and the target track, and $T_{rev}$ is a time for one revolution of a disk drive platter. The variables $T_{min}(L_T)$ and $T_H$ are then determined, where $T_{min}(L_T)$ is a minimum track seeking time to move the actuator head from the present track to the target track along a radial arc traced by the movement of the actuator head, and $T_H$ is a rotation time from the present servo sector to when the target servo sector advances to the radial arc. The value $\Delta T$ is calculated in accordance with a relationship of $\Delta T = T_{min}(L_T) - T_H$. There are three possible outcomes: (1) if $\Delta T = 0$, the actuator head movement time is set to $T_{min}(L_T)$; (2) if $\Delta T > 0$, the actuator head movement time is set to to $T_H + T_{rev}$; and (3) if $\Delta T < 0$, the actuator head movement time is set to $T_H$.

The second and third outcomes move the actuator head at a slower rate than in conventional disk drives, thereby reducing power consumption and increasing battery life.

To achieve these and other advantages and in accordance with the purpose of the invention, as embodied and broadly described, the invention provides for an adaptive sector seeking method for reducing disk drive power consumption while moving an actuator head during a movement time from a present track and present sector to a target track and target sector, comprising the steps of: (A) determining a first variable indicative of a first time period in which to move the actuator head from the present track to the target track along a radial arc traced by the movement of the actuator head; (B) determining a second variable indicative of a second time period measured from the present servo sector to when the target servo sector advances to the radial arc; (C) moving the actuator head at a first rate substantially equal to the first time period if the first variable and the second variable are equal; and (D) moving the actuator head at a second rate, slower than the first rate, if the first variable and the second variable are not equal.

The second rate is substantially equal to the second time period if the second variable is greater than the first variable. The second rate is substantially equal to a sum of the second time period and a time for one revolution of the disk drive if the first variable is greater than the second variable.

BRIEF DESCRIPTION OF THE DRAWINGS

The foregoing and other objects, aspects and advantages will be better understood from the following detailed description of a preferred embodiment of the invention with reference to the drawing, in which.

DETAILED DESCRIPTION OF A PREFERRED EMBODIMENT OF THE INVENTION

Figure 1:
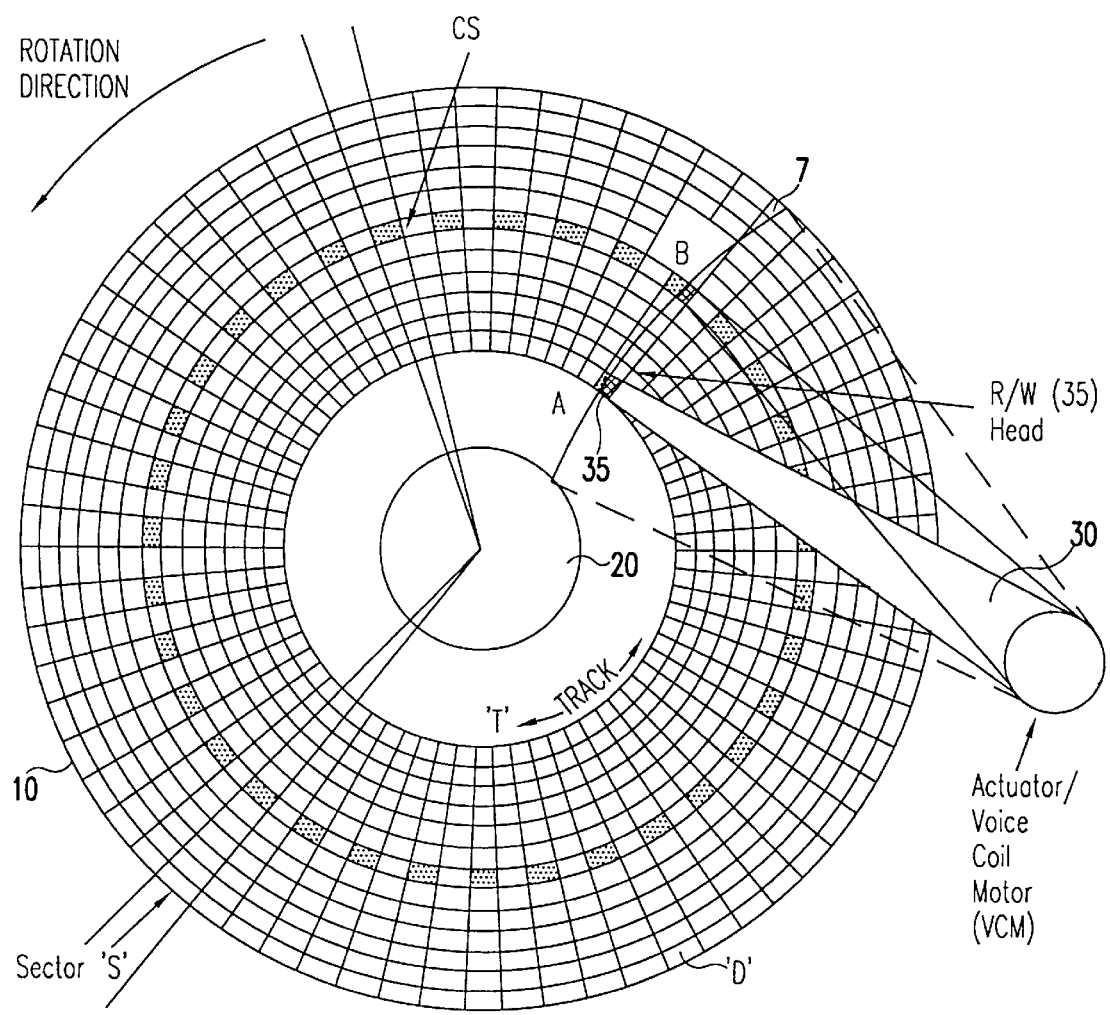
FIG. 1 is a schematic diagram of the surface of a disk drive platter showing a sector and track layout, including the critical sector location in accordance with the present invention.

The present invention is directed a method of reducing power consumption in a disk drive system by controlling a read/write head actuator to reduce power consumption without sacrificing data access time.

By way of way of background, in the prior power consumption methods, the track determining mode is designed as a Time Optimal Control (TOC) or Proximate Time Optimal Control (PTOC), in order to minimize the amount of time to move the actuator heads from an initial track to a target track to minimize the data access time. However, having the actuator heads move quickly at a maximum speed to the target track requires much more current, and consequently, much more power than moving the actuator heads at a lower speed, while taking a longer time.

The present invention seeks to reduce power consumption in a disk drive system by moving the heads at a slower speed, but without sacrificing data access time.

The steady state equation for the disk drive motor operation is:

$$I = \frac{U - T_e * \bar{\omega}}{R} \quad (1)$$

and, $$U = T_e * \bar{\omega} + I * R \quad (2)$$

where, I is the current in the actuator coil (amps),
U is the voltage on the terminals of the actuator coil (volts),
$T_e$ is the back EMF (electromotive force) constant,
$\omega$ is the arc-velocity (radians/sec), and
R is the actuator coil resistance (ohms).

After multiplying both sides of equation (2) by the current I in the actuator coil, the motor power consumption equation is shown below:

$$P_{in} = T * \bar{\omega} + I^2 * R \quad (3)$$

where, $P_{in}$, is the total power consumption (watts); and

T is the torque of the actuator arm (kg*m).

The main approach to reducing the power consumption is to reduce the amount of current input to the actuator coil. For disk drive applications, reducing the current input means reducing the torque output T and arc-velocity $\omega$. However, the amount of the current input reduction is performance limited by the elapsed movement time of the actuator arm, because the data should be read or written as fast as possible.

The next series of equations relates to the dynamics of the actuator arm, which must be analyzed in order to reduce the amount of current input to the actuator coil, and thereby to reduce the total power consumption $P_{in}$ through sector seeking control.

Initially we have:

$$T = J \frac{d\bar{\omega}}{dt} \quad (4)$$

where, $$\frac{d\bar{\omega}}{dt}$$

is the arc-acceleration, $\omega$ is the arc-velocity,

J is the total moment of inertia of the actuator's arm, and

T is the torque.

The motor operation is governed by the equation:

$$T = T_k I \quad (5)$$

where, $T_k$ is the torque constant of the actuator, and

I is the current in the actuator coil.

Combining equations (4) and (5), we have:

$$\frac{d\bar{\omega}}{dt} = CI \quad (6)$$

where, C is $T_k/J$.

For the kinetics equations, we have:

$$\omega = \frac{d\bar{\omega}}{dt} t \quad (7)$$

After combining equations (6) and (7), we have:

$$\theta = \frac{1}{2}\frac{d\bar{\omega}}{dt}t^2 = \frac{1}{2}CIt^2 = KIt^2 \qquad (8)$$

where, $\theta$ is the arc-displacement, and
K is ½C.

Assuming the arc-displacement $\theta$, that is, the track seeking length, is a constant for one seeking interval:

$$\theta = KI\tau^2 \quad t = \tau \qquad (9)$$

Here, $\tau$ is defined as the actuator movement time determined by the PTOC or TOC. Combining equations (3), (4) and (5), we have an average mechanical power consumption of:

$$T_k I = J\frac{d\bar{\omega}}{dt} \qquad (10)$$

$$P_m = \frac{1}{2}T_k I\left(\frac{d\bar{\omega}}{dt}\tau\right) \qquad t = \tau \qquad (11)$$

Combining equations (10), (11) and (3), we have:

$$P_{in} = \frac{1}{2}\left(\frac{T_k^2}{J}I^2\tau\right) + I^2 R \qquad t = \tau \qquad (12)$$

If we double the actuator movement time (i.e., 2$\tau$) for the above constant arc-displacement $\theta$, while ignoring the current change caused by back EMF, equation (9) becomes:

$$\theta = K\left(\frac{1}{4}I\right)(2\tau)^2 \qquad t = 2\tau \qquad (13)$$

Therefore, during the period t=0 to 2$\tau$, we have an average mechanical power consumption of:

$$P_m = \frac{1}{2}\frac{T_k^2}{J}\left(\frac{1}{4}I\right)^2(2\tau) = \frac{1}{8}\left(\frac{1}{2}\frac{T_k^2}{J}I^2\tau\right) \qquad t = 2\tau \qquad (14)$$

$$P_{in} = \frac{1}{8}\left(\frac{1}{2}\frac{T_k^2}{J}I^2\tau\right) + \frac{1}{4}(I^2 R) \qquad t = 2\tau \qquad (15)$$

where, $P_m$ is the average mechanical power consumption. Here, we note the average power during the period $\tau$ because we assume that the arc-velocity increases linearly with time during the period 0 to $\tau$ with an acceleration of +d$\omega$/dt.

Comparing equations (12) and (15), note the mechanical power consumption decreases by 87.5% and the current decreases by 75%. Thus, the total power consumption (in Joules) decreases by at least 75%. Assuming that the actuator movement time increases by 'n' times, we have:

$$\theta = K\left(\frac{1}{n^2}I\right)(nt)^2 \qquad t \geq \tau \qquad (16)$$

$$P_m = \frac{1}{2}\frac{T_k^2}{J}\left(\frac{1}{n^2}I\right)^2(nt) = \frac{1}{n^3}\left(\frac{1}{2}\frac{T_k^2}{J}I^2 t\right) \qquad t \geq \tau \qquad (17)$$

$$P_{in} = \left(\frac{1}{n^3}\right)\left(\frac{1}{2}\frac{T_k^2}{J}I^2 t\right) + \left(\frac{1}{n^4}\right)(I^2 R) \qquad t \geq \tau \qquad (18)$$

From equation (18), it can be seen that the average mechanical power consumption is inversely proportional to the third power of increasing 'n' and the average Joule power consumption and the current are inversely proportional to the second power of increasing 'n'.

The method of the present invention will now be more specifically described with reference to FIG. 1, which is a schematic diagram of the surface of a disk drive platter 10 showing a typical disk surface sector and track layout.

In a disk drive storage system, data is read or written in two dimensions on the magnetic plate or platter 10. Each data sector D is defined by a sector number S and a track number T on these platters 10.

Note that the spindle motor 20 spins the platter 10 around a central axis while the actuator 30 moves radially between the inner and outer circumferences of the of the platter 10. The spindle motor 20 and the actuator 30 are separately controlled, and there is no relationship between the spindle speed stabilization control, which spins the platter 10 at a constant RPM (revolution per minute), and the actuator control.

In the optimum case, the actuator 30 and read/write heads 35 will glide over the platter 10 to arrive over a unique track (track seeking time) just prior to when the target sector passes thereunder to be read or written, thus minimizing the track following time. Accordingly, actuator movement information and target sector information must be analyzed simultaneously. If, for example, the read/write head arrives at the designated track number quickly (track seeking time), but just after the target sector passes by, then the read/write head must wait at the track location for one revolution of the disk platter (track following time) in order to read or write data to the target sector.

In the data access methods described previously, the assumption is that by moving the actuator at a maximum speed, the target track will be reached in the fastest time, and accordingly, the data access time will be reduced. This assumption is not always true, and in fact, is wrong more often than it is right.

The sequence of the reading of data from, or the writing of data to a disk drive is actually a statistically random process, and depends on the initial location of the read/write head with respect to the target sector. Therefore, even though the actuator read/write head 35 is moved at the maximum speed to the target track (track seeking time), it does not mean that the read/write head 35 finds the target sector right away (track following time).

Actually, with the prior servo methods that utilize such a minimum track seeking time algorithm, the probability of finding or hitting the target sector in that minimum track seeking time is 1N, where N is the number of sectors on the platter. In other words, if the platter 10 has 70 sectors, there is a 1/70 chance of hitting the target sector at the same time that the target track is reached. For the vast majority of the time, therefore, the prior power reduction methods require an appreciable amount of track following time before the target sector is reached.

In this disclosure, the sector corresponding to the minimum sector seeking time is defined as a critical sector. The present invention utilizes a new concept to optimize latency or track following time, whereby the total actuator movement time takes into account the sector seeking time according to the fastest track seeking method, and the track following time before hitting the target servo sector.

Using the theoretical equations described previously, and taking into account the relative position of the present sector and the target sector, one can design a servo system for optimizing sector seeking without having to always move the actuator arm according to the fastest track seeking time.

Like the prior seeking methods, in the present invention the read/write head path, that is, the displacement from the present track to the target track, does not change. What does change, however, is the time it takes to move the actuator read/write head to the target sector, and more specifically, the target track.

Therefore, the sector seeking methods for power management no longer comprise just time optimal control (TOC) or proximate time optimal control (PTOC) processes. The present invention is directed to a method in which the sector seeking operation is carried out at an energy efficient Minimum-Optimal Energy Control (MOEC) with a fixed actuator arm movement time. Moreover, the present inventive method utilizes such controls without sacrificing the data assess time.

The fixed actuator arm movement time has a wide range, depending on four inputs: (1) the RPM of the spindle; (2) the relative position of the initial and target sector; (3) the difference or distance between the initial and the target track; and (4) the conventional TOC or PTOC actuator motion time.

The fixed actuator arm movement time is the shortest when the system is operating as a PTOC or TOC system, which, as described previously, has a 1/N possibility of hitting the target data sector at the same time the target track is reached.

In the best case, the actuator arm reaches the target track and the read/write heads hit the critical sector at the same time, and the heads immediately begin to read or write data to the target sector. In most cases, however, the first sector hit at the time the target track is reached is not the critical sector that we want. The system must then enter the track following mode to wait for the target sector to pass thereunder. This waiting period is usually called latency. The shortest latency period is:

$$\frac{60}{N*RPM} \quad (19)$$

where, N is the number of sectors, and
RPM is spindle speed (revolutions/minute).

The longest latency period, that is, one full revolution of the platter 10, is given by the equation:

$$\frac{60}{RPM} \quad (20)$$

The IBM Travelstar 4LP, for example, operates at 4000 RPM, has 70 sectors, and an average seeking time of 13 ms. Using equations (19) and (20), we find that the shortest latency period is 0.214 ms and the longest is 15 ms.

Therefore, the shortest total access time is 13.214 ms, since the average actuator movement takes 13 ms to reach the target track, and the target servo sector is just one sector away, i.e. 0.214 ms away. The longest total access time is 28 ms, since the average actuator movement takes 13 ms to reach the target track, and since the target servo sector was just missed the read/write heads must wait the entire revolution (15 ms) to hit the target sector.

To evaluate how much power consumption is reduced with the present method of sector seeking control, we will consider a simplified example involving the average seeking time, which is defined as the seeking time of one-third the full-stroke length. The full-stroke length is shown as arc Z, which is defined by the path traced by the read/write head 35 as shown in FIG. 1. We use such an approximate approach since the track seeking process does not always saturate the power amplifier because of the velocity limitations of the system design. For example, the full-stroke track seeking case reaches the velocity limitations about half of the total time. During this period, only very low current is applied to overcome some friction, bias force and so on. As result, the full-stroke track seeking case consumes almost the same amount of power as one-third full-stroke seeking case. Based on an observation of current output, when the seek length is greater than ⅓ full-stroke, the power consumption is almost the same as ⅓ full-stroke length seeking because of such maximum speed limitations.

The above analysis agrees with a well-known statistical result for disk drives. That is, among all the possible track seeking lengths, the one-third full-stroke length is an average length, which also can be understood as the length at which the power consumption will be the greatest.

In the example below using the IBM Travelstar 4LP with 70 sectors and a constant RPM of 4000, we can assume that since the spindle spins the platter at a constant RPM, the possibility is that the read/write heads would hit any sector equally. Therefore, we have the following equation (from where):

$$\left(\frac{1}{2}\frac{T_k^2}{J}I^2*t\right) - \frac{1}{69}\sum_{n=1}^{69}\frac{2197}{(13+n*\Delta t)^3}*\frac{1}{2}\frac{T_k^2}{J}*I^2*t = \quad (21)$$

$$\left(1 - \frac{1}{69}\sum_{n=1}^{69}\frac{13^3}{(13+n*\Delta t)^3}\right)*\left(\frac{1}{2}\frac{T_k^2}{J}I^2t\right) = 0.658\left(\frac{1}{2}\frac{T_k^2}{J}I^2t\right)$$

where, $\Delta t=0.214$ ms, and
n is a sector number which is displaced from the critical sector.

In the method of the present invention, it is realized that in most cases, the track following time will be greater than the track seeking time. As shown in equation (21) above, the power consumption is reduced by slightly more that 65%. For the IBM Travelstar 4PL, for example, the seeking (average) power consumption would be 0.79 watts, compared with the 2.3 watts of Table 1. The general equation for the amount of reduced power consumption is given as follows:

$$\left(1 - \frac{1}{N-1}\sum_{n=1}^{N-1}\frac{1}{\left(1+\frac{n*\Delta t}{T_{seeking}}\right)^3}\right)*\% \quad t \geq \tau \quad (22)$$

where, N is the number of sectors;
$T_{seeking}$ is average seeking time defined by ⅓ full seeking length;
n is sector number; and
$\Delta t$ is the rotation time for the spindle to move the platter from one sector to the next sector.

Equation (22) can be used in any sector seeking procedure, wherein, $T_{seeking}$ is the track seeking time from the present track and sector to the track where the target sector is located.

The exemplary 65% power reduction above is a theoretical conclusion. Considering the actuator dynamics, the EMF effects on the current, the friction and maximum motion speed limitations, a 50% reduction in power consumption can be expected in actual seeking operations.

In the prior track seeking methods, the difference between the target track number and present track number was used as an input to drive the actuator arm. In the present invention, we also need to know the present sector number and the target sector number. The servo sector pattern that is written on the disk platters creates a unique relationship among the sectors because of the wedge structure. Therefore, when the servo system receives a target track number, the target sector number must also be received.

With the present sector number and the spindle RPM known, a just-in time solution is calculated to move the actuator arm to hit the target sector. This just-in time solution is defined as the time from when the actuator arm begins to move until the time the actuator read/write head hits the target servo sector, which is equal to the sum of the track seeking time plus the track following time, if any, before hitting the target sector. In other words, the just-in time solution uses the maximum amount of actuator motion time to reach the target sector without missing the target sector, or hitting the target sector in less than one spindle revolution related to the critical sector position.

Figure 2:
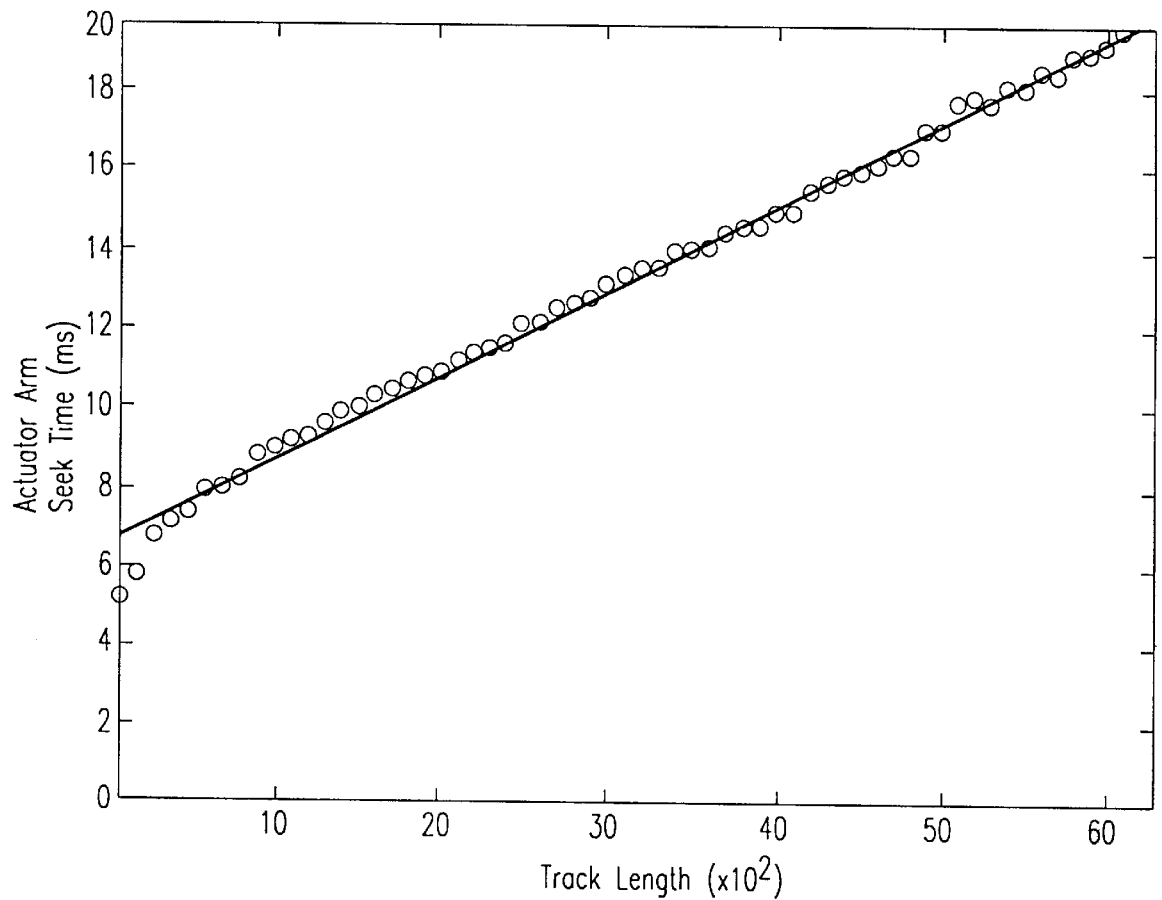
FIG. 2 is a graph of conventional PTOC or TOC data as a function of track length.

According to experience and theory, the repeatability of the actuator arm seeking times designed for PTOC or TOC, from any track to another track, is generally known within a certain tolerance. This collection of PTOC or TOC data can be approximated by a curve as a function of the track length as shown in FIG. 2.

A second critical sector data collection is then complied, which sets forth the relative position of the critical sectors on each track with regard to the speed and path traced by the read/write heads of the actuator. We can then determine if the target sector position on a certain track has passed or will pass the critical sector.

In the embodiment of FIG. 1, the critical sector CS is defined as the $60^{th}$ sector of a 70 sector platter, counting in the reverse rotation direction from position B. In the above example with the IBM Travelstar 4LP, the read/write heads 35 would just finish moving from position A to position B as the critical sector CS arrives at position B after 13 ms. It is understood, however, that an alternate sector would be chosen as the critical sector, if the relative position of the critical sector on each track changes as a result of a change in the speed and path traced by the read/write heads 35 of the actuator 30.

The critical sector CS thus represents the shortest possible seeking time. For any track, the sector along the direction of rotation that passes just before the critical sector CS will require a complete revolution before being hit by the read/write heads 35, thereby having the longest total access time. Conversely, for any track, the sector along the direction of rotation that passes just after the critical sector CS will be hit immediately by the read/write heads 35, thereby having the shortest total access time.

With the track number, sector number and relative position known, a sector seeking time within a certain tolerance can be determined. This information is then used in conjunction with the sector seeking control process flow diagram of FIG. 3, which is based on minimizing the power consumption during a fixed movement time of the actuator. The fixed movement time will depend on the fastest track seeking time in view of the target sector position and critical sector position.

The method for reducing disk drive power consumption according to the present invention may be used with magnetic or optical disk drives. The invention can be implemented in different forms, including application specific hardware, firmware, or software. In an optimum condition, the actuator head reaches the target track just prior to when the target sector passes under the actuator head. Therefore, the actuator head reaches the target track and target servo sector at the same time.

Figure 3:
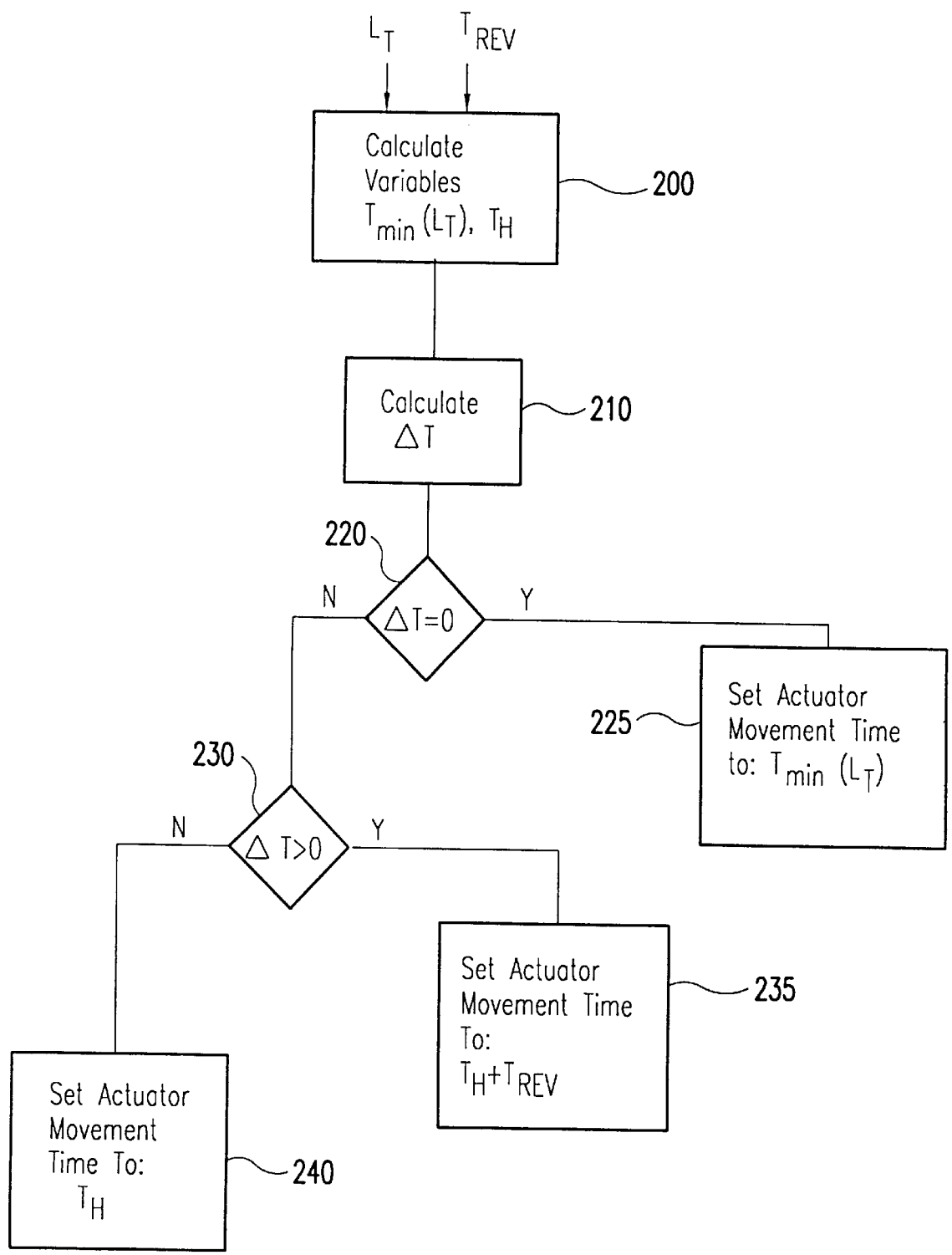
FIG. 3 is a sector seeking control process flow diagram in accordance with the present invention, which is based on minimizing the power consumption during a fixed movement time of the actuator.

Referring to FIG. 3, the process flow of the present invention utilizes inputs $L_T$ (i.e., the positional difference between the present track and the target track) and $T_{rev}$ (i.e., the time for of one revolution of the disk platter).

In Step 200, the variables $T_{min}(L_T)$ and $T_H$ are determined. $T_{min}(L_T)$ is the minimum track seeking time and is calculated as in conventional disk drive actuator movement systems. $T_{min}(L_T)$ is the minimum amount of time needed to move the head from the present track to the target track along the radial arc Z comprising points A and B in FIG. 1. In other words, $T_{min}(L_T)$ is the quickest time from the present track to the target track.

$T_H$ is the time required for the target servo sector to advance to the radial path Z traced by the actuator head 35, based on the number of sectors between the present servo sector and the target servo sector. $T_H$ is thus the time for a partial revolution of the disk platter, and is dependent on the rotational speed (revolutions per minute) of the disk platter 10, as determined by the disk drive spindle motor 20.

The value of $T_H$ can be stored in advance in a look-up table for each possible combination of the present servo sector and the target servo sector.

Alternately, $T_H$ can be calculated by multiplying the difference between the present servo sector and the target servo sector by a predetermined number. If we assume a constant rotational speed of the spindle motor 20, the difference can be multiplied by a constant, such as the rotation speed of a single sector past a given point. In such a case, the constant would be determined by dividing the RPM of the disk drive by the number of sectors in the platter. It may also be necessary to translate a logical address to a physical address prior to performing the calculations.

In Step 210, the value $\Delta T$ is determined in accordance with the following relationship:

$$\Delta T = T_{min}(L_T) - T_H \qquad (23)$$

If $\Delta T = 0$ (Step 220), that is, $T_{min}(L_T) = T_H$, then the actuator head reaches the target track at the same time the target sector passes under the actuator head. In this situation (Step 225), the actuator head movement time is set to the conventional $T_{min}(L_T)$. As stated previously, the probability of such an occurrence is 1/N, where N is the number of sectors.

If $\Delta T > 0$ (Step 230), that is, $T_{min}(L_T) > T_H$, then the conventionally driven actuator head would reach the target track after the target sector passes by. In this situation (Step 235), the actuator head movement time is slowed down to $T_H + T_{rev}$. More specifically, since the target sector is close to the present sector, the target sector would pass the arc Z before the target track is attained by the actuator head. Therefore, the head would have to wait at the target track for another revolution of the disk platter before attaining the target servo sector. Rather than using a maximum amount of energy to move the head from the present track to the target track, only to have it wait for the additional revolution, the actuator head is slowed down in an energy saving mode to the value $T_H + T_{rev}$. In this way, the actuator head would arrive at the target track at approximately the same time the target servo sector arrives at the arc Z after the partial revolution $T_H$ and the complete revolution $T_{rev}$.

If $\Delta T < 0$ (Step 240), that is, $T_{min}(L_T) < T_H$, then the conventionally driven actuator head would reach the target track before the target sector passes by. In this situation, the actuator head movement time is slowed down to $T_H$. More specifically, since the target sector is not close to the present sector, the target sector would pass the arc Z after the target track is attained by the actuator head. Therefore, the head would have to wait at the target track for the target sector to reach the arc Z. Rather than using a maximum amount of energy to move the head from the present track to the target track, only to have to wait for the target sector to reach the arc Z, the actuator head is slowed down in an energy saving mode to the value $T_H$. In this way, the actuator head would arrive at the target track at approximately the same time the target servo sector arrives at the arc Z.

In each of the last two possible outcomes, power is saved while not sacrificing data access time. In the last two situations, the actuator head movement time is slowed down by the same amount of time the conventional actuator head would have waited and followed the track until the target servo sector passed thereunder. By slowing down the actuator head by the "track following" time, one can ensure the actuator head reaches the target servo sector at the same time the target track is attained, optimizing the power consumption without sacrificing data access time.

In the present invention, therefore, since the actuator head is slowed down in the vast majority of cases, overall power consumption for the disk drive is reduced. The battery lasts much longer time than expected (measured in amp*hours) because the current is inversely proportional to the second power of the increased movement time.

Another advantage results from the fact that acoustic noise in a disk drive is caused by the high frequency content of the driving current. The higher the current the shorter the seeking time, but the more high frequency noise that is generated. With the present invention, the increase in seeking time reduces the acoustic noise level, but the total data access speed remains unaffected.

A third advantage is that reducing the movement speed of the actuator arm will increase system reliability and life because the faster the read/write head moves, the more wear there is on the disk drive's moving parts.

While the invention has been described in terms of the embodiments described above, those skilled in the art will recognize that the invention can be practiced with modification within the spirit and scope of the appended claims and their equivalents.

Having thus described my invention, what I claim as new and desire to secure by Letters Patent is as follows:

1. An adaptative sector seeking method for reducing disk drive power consumption while moving an actuator head during a movement time from a present track and present sector to a target track and target sector, comprising the steps of:

(A) determining a first variable indicative of a first time period in which to move the actuator head from the present track to the target track along a radial arc traced by the movement of the actuator head at a default actuator speed;

(B) determining a second variable indicative of a second time period measured from the present servo sector to when the target servo sector advances to the radial arc;

(C) moving the actuator head at a first rate if the first variable and the second variable are equal, the first rate being chosen such that a third time period for the actuator head to reach the target track is substantially equal to the first time period;

(D) moving the actuator head at a second rate, slower than the first rate, if the first variable is less than the second variable, the second rate being chosen such that a fourth time period for the actuator head to reach the target track is substantially equal to the second time period; and (E) moving the actuator head at a third rate, slower than the first rate, if the first variable is greater than the second variable, the third rate being chosen such that a fifth time period for the actuator head to reach the target track is substantially equal to the second time period plus a sixth time period required for one revolution of a disk drive platter of the disk drive.

2. An adaptative sector seeking method, as recited in claim 1, wherein the default actuator speed is a maximum actuator speed.

3. An adaptative sector seeking method for reducing disk drive power consumption while moving an actuator head during a movement time from a present track and present sector to a target track and target sector, comprising the steps of:

providing inputs $L_T$ and $T_{rev}$, where $L_T$ is a positional difference between the present track and the target track, and $T_{rev}$ is a time for one revolution of a disk drive platter;

determining variables $T_{min}(L_T)$ and $T_H$, where $T_{min}(L_T)$ is a minimum track seeking time to move the actuator head from the present track to the target track along a radial arc traced by the movement of the actuator head, and $T_H$ is a rotation time from the present servo sector to when the target servo sector advances to the radial arc;

calculating $\Delta T$ in accordance with a relationship of $\Delta T = T_{min}(L_T) - T_H$;

setting the actuator head movement time to $T_{min}(L_T)$ if $\Delta T = 0$;

setting the actuator head movement time to $T_H + T_{rev}$ if $\Delta T > 0$; and setting the actuator head movement time to $T_H$ if $\Delta T < 0$.

* * * * *